Feb. 27, 1923.

H. D. BRENNER.
CLOTH EXAMINING AND MEASURING MACHINE.
FILED FEB. 24, 1921.

Inventor:
Herman D. Brenner,
by Arthur H. Durand
Att'y

Feb. 27, 1923.

H. D. BRENNER.
CLOTH EXAMINING AND MEASURING MACHINE.
FILED FEB. 24, 1921.

Inventor
Herman D. Brenner
by Arthur F. Durand
Atty

Feb. 27, 1923.
H. D. BRENNER.
CLOTH EXAMINING AND MEASURING MACHINE.
FILED FEB. 24, 1921.

Inventor:
Herman D. Brenner,
by Arthur F. Durand
Atty

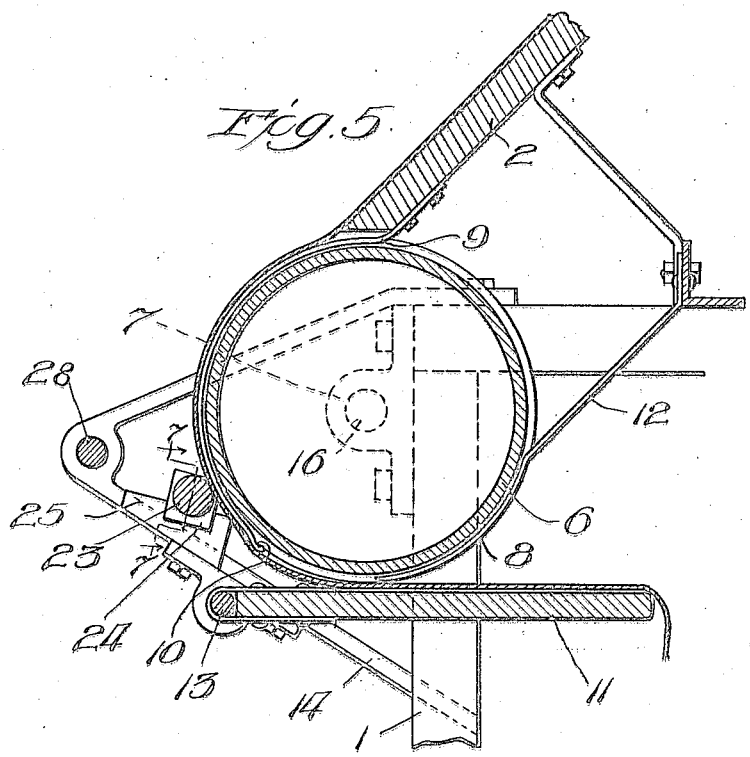
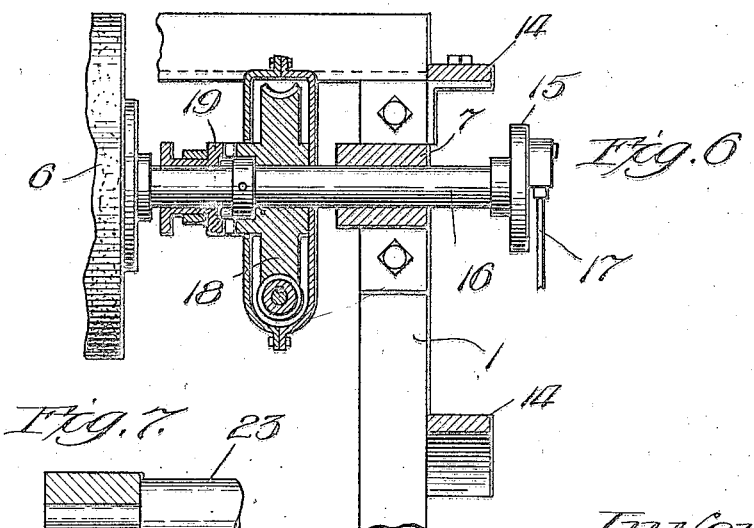

Patented Feb. 27, 1923.

1,446,496

UNITED STATES PATENT OFFICE.

HERMAN D. BRENNER, OF CHICAGO, ILLINOIS, ASSIGNOR OF ONE-FOURTH TO H. T. SPIESBERGER, ONE-FOURTH TO MILTON M. COHN, AND ONE-FOURTH TO CLARENCE A. COHN, ALL OF CHICAGO, ILLINOIS.

CLOTH EXAMINING AND MEASURING MACHINE.

Application filed February 24, 1921. Serial No. 447,375.

*To all whom it may concern:*

Be it known that I, HERMAN D. BRENNER, of Chicago, Cook County, Illinois, have invented a certain new and useful Improvement in Cloth Examining and Measuring Machines, of which the following is a specification.

This invention relates to machines for examining cloth, or to machines for measuring cloth, or machines for both purposes, such as those employed by manufacturing tailors, or in other establishments where large quantities of cloth are handled.

This is an improvement on the machine shown and described in application Serial No. 422,770 filed November 8, 1920.

Generally stated, the object of the invention is to provide an improved construction and arrangement whereby the cloth will travel over a surface, when it is spread out, so that the surface is covered by the full width of the cloth, and whereby the inspector or attendant operating the machine may control the movement of the cloth at will, so that the cloth can be stopped whenever such is necessary or desirable, and having means to fold the examined cloth at the front of the machine, as will more fully appear.

It is also an object to provide certain details and features of construction and combinations tending to increase the general efficiency and desirability of a machine of this particular character, or any machine constructed to receive cloth for any necessary or desired purpose.

To these and other useful ends the invention consists in matters hereinafter set forth and claimed and shown in the accompanying drawings, in which:

Figure 5 is an enlarged detail section.

Figure 6 is an enlarged section on line 6—6 in Figure 4.

Figure 7 is an enlarged section on line 7—7 in Figure 5.

Figure 1:
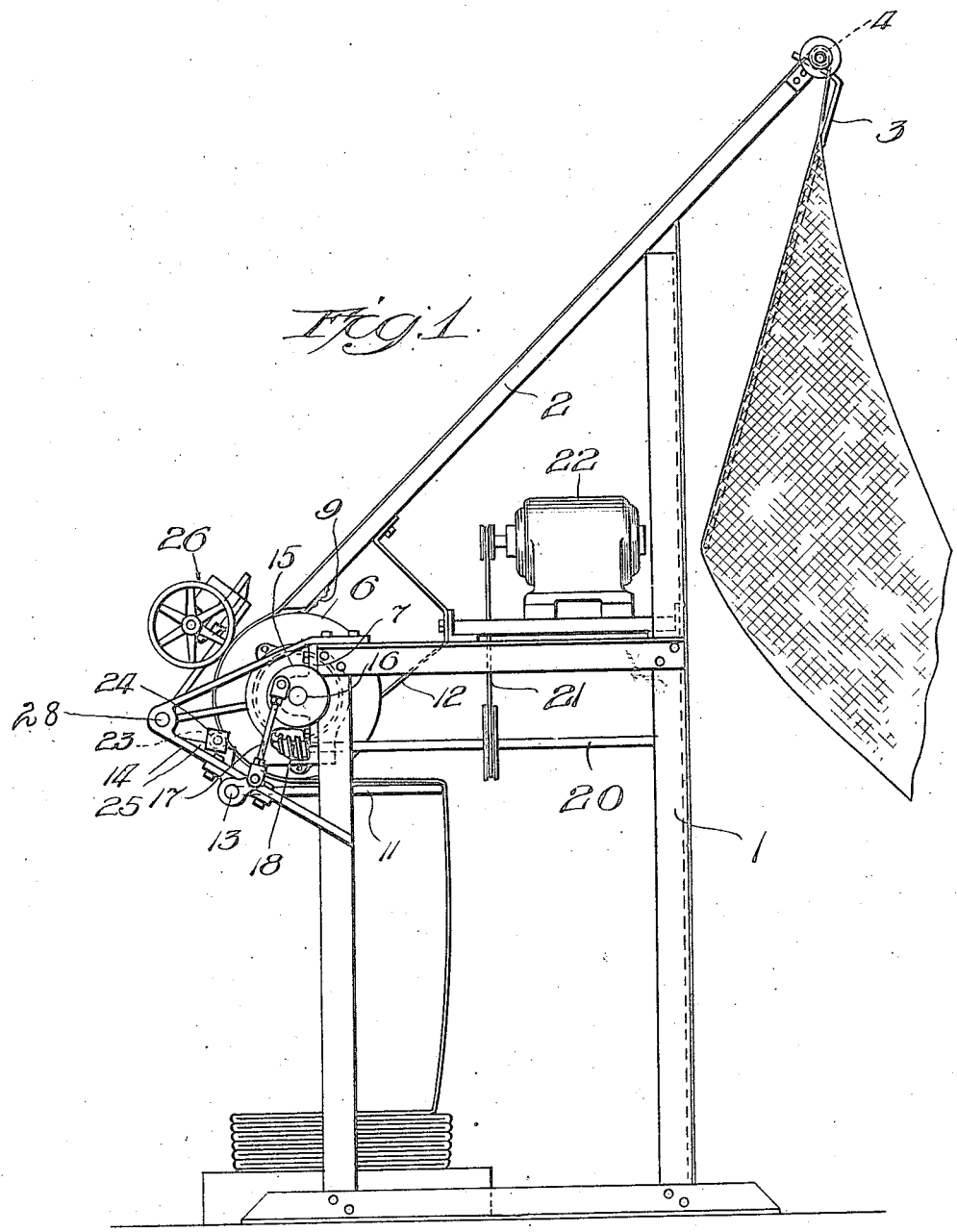
Figure 1 is a side elevation of a cloth examining machine embodying the principles of the invention.
Figure 2:
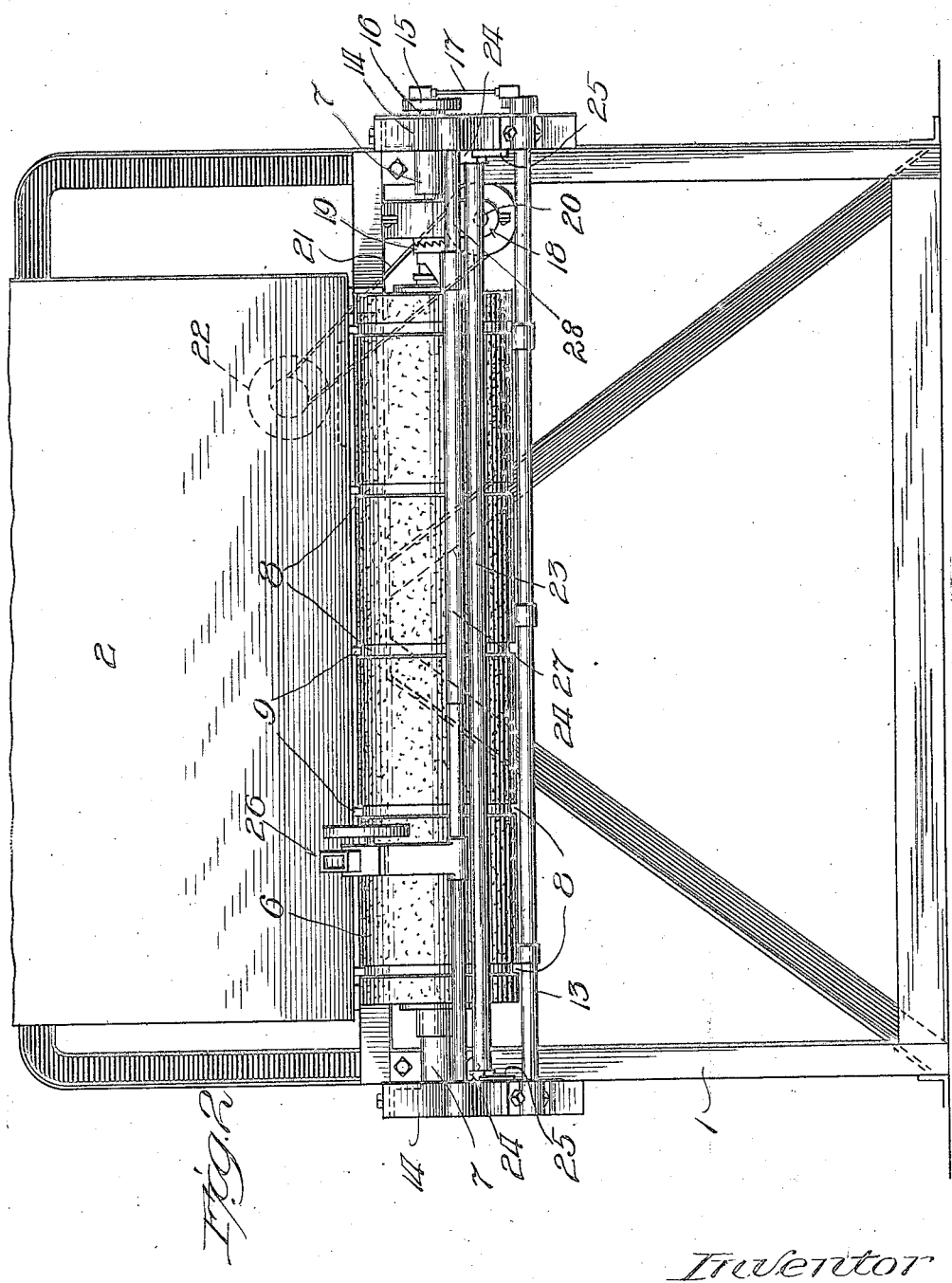
Figure 2 is a front elevation of said machine.
Figure 3:
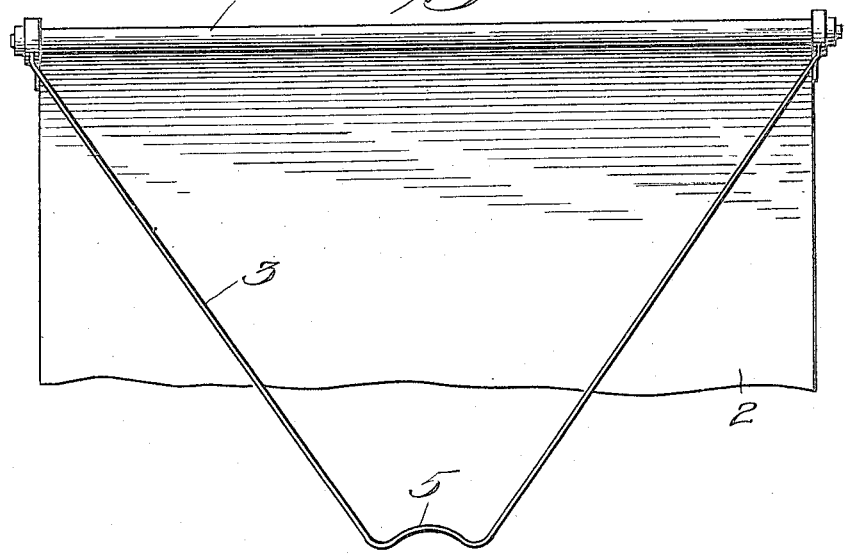
Figure 3 is a rear elevation of the upper portion of said machine.
Figure 4:
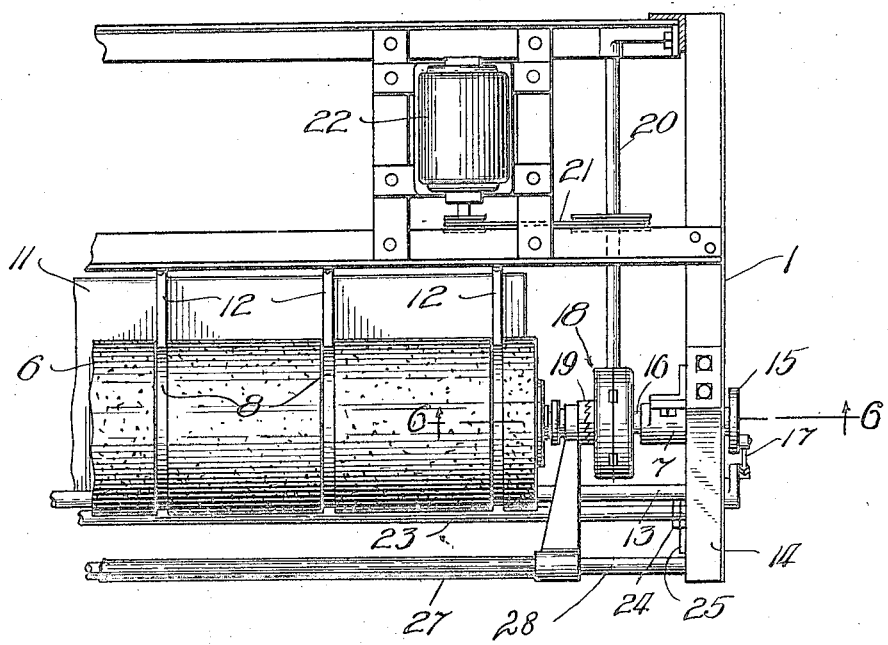
Figure 4 is a detail plan view of a portion of said machine.

As thus illustrated, the invention comprises a body frame 1 upon which the inclined table or examining board 2 is removably mounted in any suitable or desired manner. The spreader 3 is shaped, as shown, to enter the cloth and spread the same so that it will pass in single thickness over the roll 4 to the upper end of said table. The lower end of this V-shaped rod forming the spreader 3 is humped upward at 5, as shown, to ensure the best results in spreading the cloth. The large roll or drum 6 has a sand or other rough surface to receive and pull the cloth from the lower end of said table 2, and has its ends provided with journals or shafts upheld in bearings formed by the pockets 7 on the body frame. Said roll has circumferential grooves 8, and the body frame has strips 9 that extend over the roll into said grooves, and that have lower ends 10 to press the cloth away from the under side of the roll, just before the cloth rides or floats onto the folder 11 immediately below the roll. The guards 12 are supported on the machine frame in position to extend into said grooves 8, below the roll, to keep the cloth from following the upwardly moving surface of the roll. Said folder 11 is pivoted at 13 on the brackets 14 and swings up and down at its inner end. A crank plate 15 on the roll shaft 16 is connected by a pitman 17 with said folder, so that the driving of the roll serves to operate said folder. A worm gearing 18 on said shaft 16 is connected by the clutch 19 with the shaft, and a shaft 20 drives said gearing, being driven in turn by the belt 21 which is operated by the motor 22 on the body frame. A floating roll 23 is supported by bearing blocks 24 that slide on the inclined guides 25, so that said small roll 23 is free to gravitate against the front of the large roll 6, to keep the cloth pressed against the latter. Said roll 23 can, of course, back away from the roll 6, automatically, to allow for thicker cloth.

A cloth meter 26, of any suitable character, is mounted to bear upon the cloth over the roll 6, so that it is operated by the cloth actually on the roll.

Said clutch 19 is controlled by the controller bar 27 which is arranged transversely at the front of the machine, to slide endwise on the rod 28, so that the operator or attendant standing at the front of the machine may shift the bar endwise to open or close the clutch at will.

The cloth is discharged from the inner end of the folder 11, and is by the motion of the folder caused to fold back and forth in a pile or heap, as shown in Figure 1, in the clear space left for this purpose in the front of the body frame. The motor 22, and all of the operating parts, are above this space, so that the cloth cannot get tangled up with anything. The cloth thus goes in at the rear and comes out at the front.

In use, the cloth is fed in at the rear of the machine, as explained, and travels down the inclined surface of the table or examining board 2, which latter may have a white surface, or a surface of any suitable character, to facilitate the examination of the cloth to discover defects and imperfections therein. As the cloth travels downward, it can be stopped at any time, by the operator or attendant, by the said controller which controls the clutch, and the cloth thus examined is measured by the meter and then folded below in the space left in the front portion of the body frame of the machine. Thus the folded cloth is conveniently disposed at the front of the machine, where the operator or attendant stands who controls the machine and examines the cloth.

As shown, the meter 26 is mounted to swing on the rod 28 which is held in the brackets 14 previously described.

In this way said rod has the double function of supporting both the meter and the tubular handle or controller. Thus it will be seen that the cloth travels downwardly over the inclined table and onto the positively driven drum 6, so that the cloth is fed by engagement of said drum with the under surface thereof, and is not pulled or fed by engagement of anything with the outer or top surface of the cloth, it being understood that the cloth travels downward over the table with the wrong side of the fabric against the table and with the right side of the cloth in full view of the examiner or inspector who is doing the work. The roll 23 engages the outer surface of the cloth, but merely to keep the latter pressed tightly against the feeding drum 6, which carries the cloth downward and onto the swinging member 11 that accomplishes the folding of the cloth in the space in front of the machine.

What I claim as my invention is:

1. In a cloth examining machine, the combination of means to provide a surface upon which the cloth is spread out to permit inspection thereof, and instrumentalities for causing the cloth to travel over said surface under control, so that the cloth can be stopped at will, with a clear space directly below said instrumentalities at the front of the machine for the discharge of the cloth.

2. A cloth examining machine as specified in claim 1, in combination with means in said space to fold the cloth back and forth in a position which is accessible at the front of the machine.

3. A cloth examining machine as specified in claim 1, in combination with a folder disposed in said space, by which the cloth is discharged from the machine, and means whereby said folder is operated by connection with said instrumentalities.

4. A cloth examining machine as specified in claim 1, said instrumentalities comprising a roll to receive and pull the cloth directly from said surface, a shaft to support said roll, worm gearing on said shaft to drive the roll, a clutch on said shaft to communicate power thereto from said gearing, thereby to communicate power directly from the surface of said roll to the under surface of the cloth and a hand controller connected to control said clutch.

5. A structure as specified in claim 1, said instrumentalities comprising a roll to receive and pull the cloth directly from said surface, by engagement with the under surface of the cloth with circumferential grooves in said roll, and means extending over the roll in said grooves to push the cloth away from the under side of the roll.

6. A structure as specified in claim 1, said instrumentalities comprising a roll to receive and pull the cloth from said surface, by engagement with the under surface of the cloth, and a motor and connections above said space to drive said roll, so that the operating parts of the invention are all above the discharged cloth.

7. A structure as specified in claim 1, and a folder pivoted at the front of the machine and extending rearward, said instrumentalities comprising a roll disposed immediately over said folder, worm gearing at the end of said roll, a clutch to connect said gearing with said roll, means whereby rotation of the roll operates said folder, and means to drive said gearing.

8. A structure as specified in claim 1, said instrumentalities comprising a large roll to receive and pull the cloth from said surface, a smaller roll to press the cloth against the front of said large roll, and supporting means whereby said small roll is free to gravitate against the large roll.

9. A structure as specified in claim 1, said instrumentalities comprising a gravitational pressure roll to allow for different thicknesses of cloth.

10. In a cloth examining machine, the combination of a roll to receive and pull the cloth through the machine, a folder pivoted at the front of the machine and extending under said roll, with a clear space below the roll for the folded cloth.

11. In a cloth examining machine, a spreader comprising a V-shaped rod with an upward hump in the lower transverse end portion thereof.

12. In a cloth examining machine, controlling mechanism therefor, a rod transverse at the front of said machine, a hand controller in the form of a tube movable endwise on said rod, and means whereby said tube controls said mechanism.

13. A structure as specified in claim 16, and a cloth meter mounted to swing on said rod, so that said rod has the double function of supporting both the controller and the meter.

14. In a machine of the class described, an inclined table, means for supplying sheet material to the upper end of said table, folding means below the lower end of the table, and a drum for engaging only the under side of the sheet material to feed the latter directly from the table to said folding means.

Signed

HERMAN D. BRENNER.